(12) United States Patent
Bryar et al.

(10) Patent No.: US 8,799,401 B1
(45) Date of Patent: Aug. 5, 2014

(54) SYSTEM AND METHOD FOR PROVIDING SUPPLEMENTAL INFORMATION RELEVANT TO SELECTED CONTENT IN MEDIA

(75) Inventors: Colin M. Bryar, Seattle, WA (US); Hilliard B. Siegel, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 2275 days.

(21) Appl. No.: 10/886,922

(22) Filed: Jul. 8, 2004

(51) Int. Cl.
*G06F 15/16* (2006.01)

(52) U.S. Cl.
USPC ........... 709/217; 709/219; 709/218; 709/224; 715/744

(58) Field of Classification Search
USPC .......................................... 709/217, 219, 228
See application file for complete search history.

(56) References Cited

U.S. PATENT DOCUMENTS

| | | | |
|---|---|---|---|
| 5,598,557 A * | 1/1997 | Doner et al. ...................... 707/5 |
| 5,748,805 A * | 5/1998 | Withgott et al. .............. 382/306 |
| 5,963,966 A * | 10/1999 | Mitchell et al. ................ 715/236 |
| 5,970,483 A | 10/1999 | Evans |
| 5,987,448 A | 11/1999 | Evans |
| 6,006,265 A * | 12/1999 | Rangan et al. ................. 709/226 |
| 6,104,834 A * | 8/2000 | Hull .............................. 382/209 |
| 6,209,092 B1 * | 3/2001 | Linnartz ........................ 713/176 |
| 6,226,631 B1 | 5/2001 | Evans |
| 6,269,189 B1 * | 7/2001 | Chanod .......................... 382/229 |
| 6,289,342 B1 * | 9/2001 | Lawrence et al. ..................... 1/1 |
| 6,341,306 B1 * | 1/2002 | Rosenschein et al. ......... 709/217 |
| 6,363,179 B1 | 3/2002 | Evans |
| 6,449,616 B1 * | 9/2002 | Walker et al. ................... 707/10 |
| 6,453,079 B1 | 9/2002 | McInerny |
| 6,532,461 B2 | 3/2003 | Evans |
| 6,567,801 B1 * | 5/2003 | Chiang et al. ...................... 707/3 |
| 6,584,479 B2 * | 6/2003 | Chang et al. ................... 715/205 |
| 6,766,363 B1 * | 7/2004 | Rothschild .................... 709/219 |
| 6,802,006 B1 * | 10/2004 | Bodrov .......................... 713/187 |
| 6,963,906 B2 * | 11/2005 | Portuesi ........................ 709/217 |
| 7,013,309 B2 * | 3/2006 | Chakraborty et al. ................. 1/1 |
| 7,043,085 B2 * | 5/2006 | Takayama ..................... 382/228 |
| 7,095,871 B2 * | 8/2006 | Jones et al. .................... 382/100 |
| 7,137,067 B2 * | 11/2006 | Yanase et al. ................. 715/243 |
| 7,362,901 B2 * | 4/2008 | Walch ........................... 382/199 |
| 7,506,250 B2 * | 3/2009 | Hull et al. ..................... 358/1.16 |
| 2003/0233451 A1 * | 12/2003 | Ludvig et al. ................. 709/225 |
| 2004/0199875 A1 | 10/2004 | Samson |
| 2004/0205448 A1 * | 10/2004 | Grefenstette et al. ......... 715/500 |
| 2005/0096938 A1 | 5/2005 | Slomkowski |
| 2006/0036585 A1 * | 2/2006 | King et al. ........................ 707/3 |
| 2006/0106847 A1 * | 5/2006 | Eckardt et al. ................ 707/101 |

\* cited by examiner

*Primary Examiner* — Hua Fan
(74) *Attorney, Agent, or Firm* — Knobbe, Martens, Olson and Bear, LLP (57) ABSTRACT

A computer-implemented method and system provides supplemental information to a user of media in which the supplemental information is relevant to selected content in the media. An embodiment of the method comprises obtaining an image of selected content, identifying a meaningful characteristic of the selected content in the image, obtaining supplemental information that is relevant to the selected content based on the meaningful characteristic, and providing the supplemental information to the user of the media. A meaningful characteristic may be a source or subject of the selected content. Identifying the source of selected content may include matching text from the content with content of known source or matching a digital signature obtained from the selected content with digital signatures obtained from known content. The method may further comprise ranking the supplemental information based on one or more criteria and providing the supplemental information to the user in accordance with the ranking.

25 Claims, 9 Drawing Sheets

SYSTEM AND METHOD FOR PROVIDING SUPPLEMENTAL INFORMATION RELEVANT TO SELECTED CONTENT IN MEDIA

FIELD OF THE INVENTION

The present invention relates to a computer-implemented system and method that provide information relevant to media content that may include, but is not limited to, books, magazines, music, video, etc.

BACKGROUND OF THE INVENTION

As the use of computer-based networks such as the Internet continues to expand, content providers are providing more and more content in digital form. This content includes traditional media such as books, magazines, newspapers, newsletters, manuals, guides, references, articles, reports, documents, etc., that exist in print, as well as electronic media in which the aforesaid content is distributed in digital form. Music and video are also increasingly stored and distributed in digital form.

Nevertheless, in a majority of cases, information in media tends to be static. That is, after the information is fixed in a medium (e.g., printed in a book), the information is not updated, except by revising and printing another version of the book. Separate addenda may be printed and physically added to a book, but considerable additional effort is required to locate the book and have the addendum appropriately placed in the book. Also, the addenda is current only as of its printing date.

In many circumstances, users of media desire to obtain supplemental information that is related to the content of the media they are using. For example, a user reading a book that mentions an event in history may wish to know more about that event. In other examples, a user may wish to view an updated bibliography of a book that the user is reading, or read more about an audio recording to which the user is listening. Quite often, however, relevant supplemental information is located only after a user considers a search strategy and searches extensively for the information. Searching can be difficult and time-consuming on the part of the user. To obtain the desired information, the user may need to travel to a library or bookstore to conduct a search. While more and more information is available in digital form, a user still needs to electronically search for the information without any certainty that the search will be successful. In yet other circumstances, users of media may not even know that relevant supplemental information is available, and thus may not even undertake a search for such information.

What is needed is a system and method that identifies media content that a user is using and provides relevant supplemental information to the users in an easy, efficient, and automated manner. Desirably, the supplemental information is organized in a such a way that users receive the supplemental information that is most relevant to the content of the media being used.

SUMMARY OF THE INVENTION

Embodiments of the present invention provide a system, method, and computer-readable medium that provide relevant supplemental information to users of media in an easy and efficient manner. Such media may include, but is not limited to, books, magazines, music, video, etc. In one exemplary embodiment where media in printed form is concerned, a selected portion of the printed content (such as a phrase, paragraph, page, cover, back, or spine of a book) is input into a computer using a video camera, scanner, digital camera, copier, pen, or other device capable of capturing an image of the selected content. The selected content or a feature thereof is then analyzed and compared to a database of known digital content to identify the source of the selected content. If matching content in the database is found, the source of the selected content is known and supplemental information relevant to the content is made available to the user. In other embodiments, a subject of the selected content is identified and used to obtain relevant supplemental information. In either case, the source or subject of the selected content may comprise a "meaningful characteristic" of the selected content, as that term is used herein.

Generally described, selected content is received from a device associated with a user and analyzed to identify a meaningful characteristic. Using the meaningful characteristic, supplemental information that is relevant to the selected content is obtained and provided to the user.

An analysis, such as optical character recognition, may be performed on an image of selected content to generate digital text that is used as source-identifying information. The digital text is compared to a database of digital content of known source to identify the source of the selected content. Alternatively, a digital signature representing the selected content may be generated by processing the image of the selected content. The resulting digital signature is compared to a database of digital signatures previously obtained by applying the same process to images of content of known source. One or more types of computer-implemented matching, such as text matching using text in the selected content or signature matching using a digital signature derived from the selected content, may result in identifying the source and/or subject of the selected content. Supplemental information that is relevant to the selected content is then retrieved and made available to the user.

One or more key terms in the selected content may be used to identify and retrieve relevant supplemental information. The meaningful characteristics identified from the selected content (discussed above) may be used as key terms. In another embodiment, a meaningful characteristic identified from the selected content may be converted to a key code, in which supplemental information is obtained from information having one or more associated key codes that match the key code of the selected content. Non-limiting examples of key codes may include SKU codes, ISBN codes, or other numeric, character, or alphanumeric codes. If multiple items of supplemental information are retrieved, the supplemental information may be ranked based on one or more criteria and provided to the user in accordance with the ranking. Suitable criteria may include keyword matching criteria, subject matter classification, and a measured popularity of the supplemental information.

In another aspect of the invention, a computer system is provided for making supplemental information available to users of media. The computer system may include a digital media server that communicates with a supplemental information database and a digital media database. The digital media server is configured to receive a request for supplemental information that includes an image of selected content, identify a meaningful characteristic of the selected content in the image, retrieve supplemental information from the supplemental information database that is relevant to the selected content, and provide the supplemental content to the user.

In yet another aspect, a computer-readable medium may be provided with content that causes a computing system to operate in accordance with methods described herein.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Embodiments of the present invention provide an advantageous way in which users of media may easily, efficiently, and automatically receive supplemental information that is relevant to selected content in the users' media. There are numerous contexts in which the invention may be implemented, of which the following are only examples. For instance, a user may be reading a book under a lamp with a built-in camera that is capable of automatically capturing an image of the page the user is reading and transmitting the image to a computer. Supplemental information that is relevant to the content of the page is then retrieved and displayed on the screen of the user's computer. As another example, a user reading a product manual may wish to know whether the manufacturer has published corrections to the manual. The user may operate a cell phone camera to capture an image of the manual's title page and receive supplemental content relevant to the manual, which may include any published corrections. As yet another example, a user viewing media content that references the name of a popular appetizer may be provided information indicating where a recipe for the appetizer may be found. In each of these and other examples, the user receives supplemental information that is relevant to selected content in the media that the user is reading, viewing, listening, or otherwise using.

In general terms describing one embodiment of the invention, an image of selected content is received from a computing device associated with a user. The image is then analyzed to identify a meaningful characteristic of the selected content in the image, such as a source or subject of the content. Using the meaningful characteristic, supplemental information is obtained and provided to the user's computing device for display.

Selected content may be obtained from media in many forms, such as print, audio, or video form. For example, content in printed form may be input using a digital imaging device capable of capturing an image of the printed content. Content in printed form may also be obtained from a digital file having one or more perceptible images of the content. A user may "select" content by simply allowing the content to be subjected to a device or process that can capture an image of the content. Furthermore, affirmative input on the part of the user, while permitted, may not be necessary to identify selected content and obtain supplemental information. In instances where the media is in an audio or video format, an "image" of selected content in the media may be a segment of the audio or video (e.g., a time-limited portion of the audio content or an image frame from the video).

As will be described in more detail below, a process for identifying a meaningful characteristic of selected content in an image may include identifying a source or subject of the selected content. For example, a source of selected content may be an author, title, series, or compilation from which the selected content derives. A subject of selected content may be identified from text or graphics in the selected content, from metadata associated with the selected content, or from the source of the selected content.

In any event, relevant supplemental information is obtained using an identified meaningful characteristic of the selected content. Supplemental information may be obtained, for example, from items of information having one or more key terms that match the identified meaningful characteristic. For instance, supplemental information on a person (e.g., "Elvis Presley") identified as a source or subject of selected content may be obtained using a key term that is the person's name.

In other embodiments, a meaningful characteristic of selected content may be first translated to a key code. Supplemental information is then obtained from items of information having one or more associated key codes that match the key code of the selected content.

Key codes may be automatically or manually assigned, and may incorporate some of the selected content, if desired. Key codes may be numbers, letters, symbols, alphanumeric sequences, etc. Using key codes may enable faster identification of relevant supplemental information. For example, a meaningful characteristic may be a geographic location (e.g., "Arches National Park" in Utah), identified in a selected content. The geographic location is associated with a particular key code that is then searched against a repository of supplemental information previously associated with key codes. A matching key code indicates supplemental information that is relevant to the selected content.

If desired, key codes may be configured to indicate categories and subcategories. As one example, a category and subcategory may be a geographic region and a location in the geographic region. The key code of a geographic location identified in a selected content may be used to obtain supplemental information relevant to either the geographic location or the region in which it is located. Of course, many other examples illustrative of the invention will be recognized from the description herein.

In accordance with further aspects of the invention, supplemental information may be ranked according to one or more criteria when providing the supplemental information to the user. As will be described herein, such criteria may include keyword matching, subject matter classification, and/or popularity ratings for the supplemental information. In this manner, a large quantity of "relevant" supplemental information can be organized and tailored to specific interests of the user when being presented to the user.

The description that follows provides an overview of a computing environment in which embodiments of the present invention may be implemented. Following that, an exemplary method of providing supplemental information to users of media is described. It should be readily understood that the examples described herein are not intended to be exhaustive or to limit the invention to the precise forms disclosed. Similarly, method steps described herein may be interchangeable with other steps, or several combinations of steps, to achieve the same result without departing from the scope of the invention.

Exemplary Computing Environment and Architectures

Figure 1:
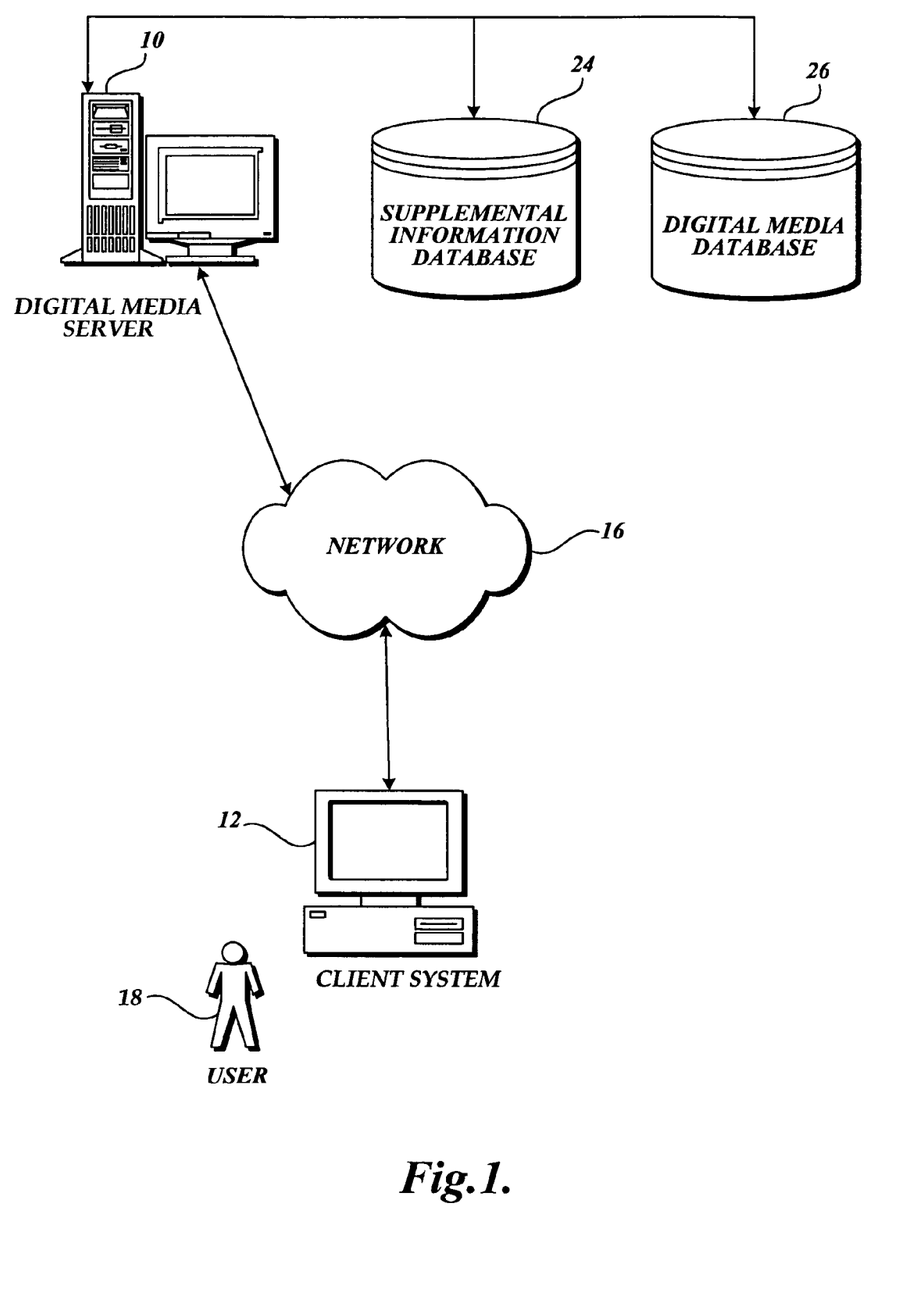
FIG. 1 is a pictorial diagram showing an exemplary environment in which embodiments of the invention may be implemented.

FIG. 1 provides an exemplary overview of one computing environment in which embodiments of the invention may be implemented. The depicted environment includes a digital media server 10 and a client system 12 communicatively connected by a network 16, such as the Internet. The client system 12 is shown associated with a user 18. As further depicted in FIG. 1, the digital media server 10 communicates with a supplemental information database 24 and digital media database 26.

The client system 12 is configured to obtain one or more images of selected content that a user is using. The images are then transmitted to the digital media server 10 via the network 16. In this regard, the client system 12 may execute an application that automatically captures and transmits one or more images of selected content to the digital media server 10. For example, a client application may operate a digital imaging device to automatically obtain an image of content in print media that the user is reading. The content, in this case, may include text or graphics in the media. Where audio or video media is concerned, the client application may capture a segment of the audio or video and transmit the segment as an "image" of the selected content. The term "image" may refer to any perceived pattern of information, as appropriate, whether it be information perceptible to humans or to machines.

The digital media server 10 receives an image of selected content from a client system 12 and performs an analysis on the image to identify a meaningful characteristic, such as a source or subject of the content in the image. For example, the digital media server 10 may use an optical character recognition program to recognize and identify text contained in an image of content. Some or all of the text, or information generated from the text, may then be compared to a repository, such as the digital media database 26, containing known content in digital form. By finding matching content in the database, the source and/or subject of the selected content may be identified. After identifying the source or subject of the selected content, the digital media server 10 may use the source or subject information to query the supplemental information database 24 for relevant supplemental information. Items of relevant supplemental information may then be transmitted to the client system 12 and provided to the user 18.

The network 16 in FIG. 1 may be a Local Area Network ("LAN"), a larger network such as a Wide Area Network ("WAN"), or a collection of networks, such as the Internet. Protocols for network communication, such as TCP/IP, are well known to those skilled in the art of computer networks.

As will be appreciated by those skilled in the art and others, FIG. 1 provides a simplified example of one computing environment suitable for implementing embodiments of the present invention. In other embodiments, the functions and features of the computing systems shown, e.g., the digital media server 10, the client system 12, the supplemental information database 24, and the digital media database 26, may be implemented using a greater number of computing systems, or reduced to a single computing system and thus not require network protocols for communication between the combined systems.

In any event, when software formed in accordance with the invention is implemented in one or more computer systems, the computer systems provide a way for users of media to easily access supplemental information that is relevant to selected content in the media. The digital media server 10 may generate, for example, markup documents for display in an application, such as a Web browser, operating at the client system 12. Allowing a user of media to access supplemental information quickly and easily using a Web interface is expected to enhance the user's experience with the media content.

Figure 2A:
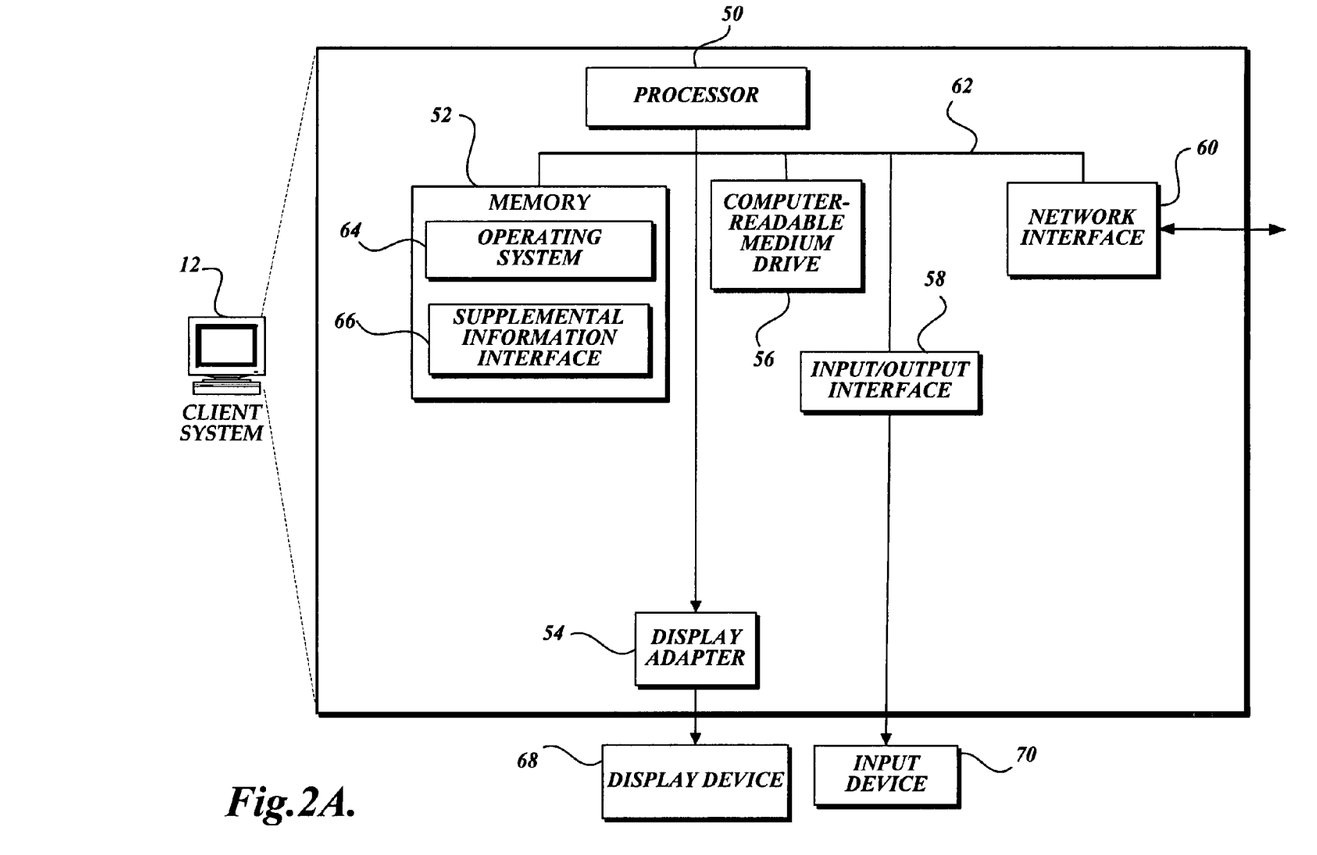
FIG. 2A is a block diagram showing some of the components that may be incorporated in a client system as depicted in FIG. 1.
Figure 2B:
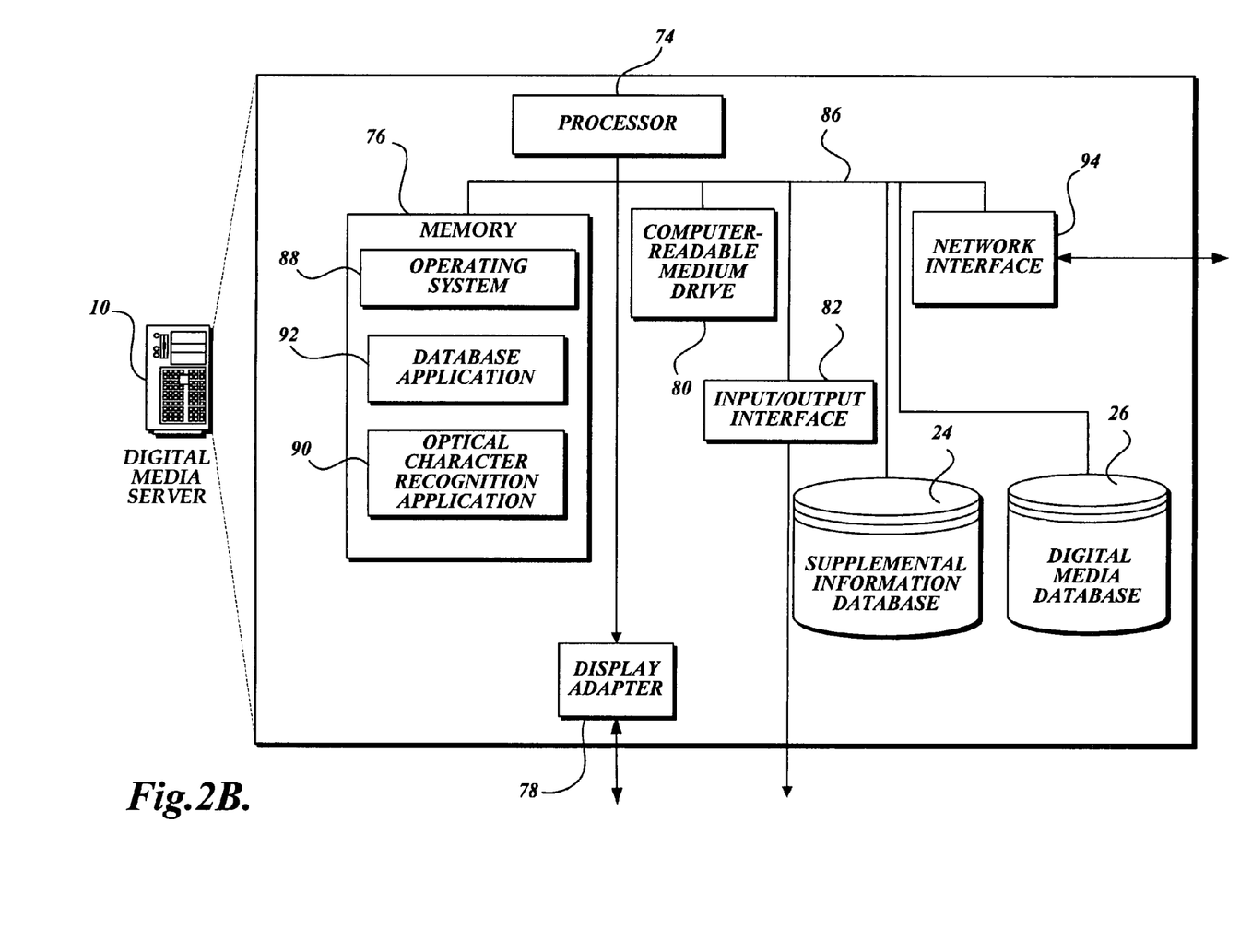
FIG. 2B is a block diagram showing some of the components that may be incorporated in a digital media server as depicted in FIG. 1.

FIGS. 2A and 2B describe exemplary computer architectures for the digital media server 10 and the client system 12 shown in FIG. 1. The exemplary computer architecture for the client system 12 (FIG. 2A) and digital media server 10 (FIG. 2B) can be used to implement one or more embodiments of the present invention. Of course, those skilled in the art will appreciate that the client system 12, as well as the digital media server 10, may include greater or fewer components than those shown in FIGS. 2A and 2B.

The client system 12 in FIG. 2A connects to the network 16 (FIG. 1) using a network interface 60. The network interface 60 includes the necessary hardware and software to allow the client system 12 to communicate with other computing devices, such as the digital media server 10, via the network 16 using one or more suitable communication protocols, such as TCP/IP. The client system 12 further includes a processor 50, a memory 52, a display adapter 54, a computer-readable medium drive 56 (e.g., disk drive), and an input/output interface 58, all communicatively connected to each other and to the network interface 60 by a communication bus 62. The memory 52 generally comprises RAM, ROM, and/or permanent memory. The memory 52 stores an operating system 64 for controlling the general operation of the client system 12. The operating system 64 may be a general-purpose operating system such as a Microsoft® operating system, UNIX® operating system, or Linux® operating system.

The memory 52 additionally stores program code and data that provides a supplemental information interface 66. The supplemental information interface 66 comprises computer-executable instructions that, when executed by the processor 50, obtains one or more images of selected content and transmits the images to a digital media server 10. The supplemental information interface 66 also comprises instructions that, when executed, cause supplemental information received from the digital media server 10 to be displayed to the user. The supplemental information interface 66 may be provided by a wholly separate application executing on the client system 12, or it may be integrated into another application such as a Web browser.

The display adapter 54 provides signals to a display device 68 that enables a user to observe and interact with the client system 12. The display device 68 may be a typical display device, such as a computer display (e.g., CRT or LCD screen), television, amplifier, speakers, etc., that is used to display or play back supplemental information relevant to the selected content received from the user.

The input/output interface 58 is configured to communicate with one or more external devices, such as an input device 70 that may be used to capture images of selected content. Input device 70 may be any device capable of capturing images including but not limited to a video camera, scanner, digital camera, copier, microphone, scanning pen, etc. The input/output interface 58 may also communicate with external devices not shown in FIG. 2A, such as a mouse, keyboard, pen, or other input device that can be operated by a user.

FIG. 2B depicts an exemplary computer architecture for the digital media server 10 shown in FIG. 1. The digital media server 10 in FIG. 2B includes several components that may operate similar to components of like name described above in regard to the client system 12. The digital media server 10 includes a processor 74 in communication with a memory 76, a display adapter 78, a computer-readable medium drive 80, an input/output interface 82, and a network interface 84, all communicatively connected by a bus 86. The memory 76, as shown, stores an operating system 88 that controls the general operation of the digital media server 10.

In this particular embodiment, the memory 76 further stores an optical character recognition application 90 comprised of program code and data designed to analyze images containing content in printed form and produce corresponding digital text. An optical character recognition application 90 may translate images of characters using a standard encoding scheme (such as ASCII or Unicode) to digitally represent the characters in the image. These standard encoding schemes specify a correspondence between digital bit patterns and symbols of a written language, thus allowing a computer to process, store, and communicate character-oriented information. Examples of commercially-available optical character recognition software include OmniPage Pro from ScanSoft, Inc., and FineReader from SmartLink Corporation.

The memory 76 additionally stores program code and data providing a database application 92. On one side, the database application 92 interacts with the digital media database 26 and the supplemental information database 24, and on the other side, the database application 92 interacts with one or more client systems 12. For example, if the database application 92 receives an image of selected content from the client system 12 containing printed text, the optical character recognition application 90 translates the image into digital text. The digital text is then analyzed for one or more meaningful characteristics, such as a source or subject of the content.

The database application 92 then uses a meaningful characteristic of the selected content to obtain supplemental information that is relevant to the selected content. In that regard, the database application 92 may query a database that contains a large collection of digital media, such as the digital media database 26, in order to identify digital media of known source that matches the selected content. Once the source of the selected content is identified (in this example), the database application 92 queries the supplemental information database 24 for relevant items of supplemental information. The database application 92 then delivers the relevant supplemental information to the client system 12. These processes are described below in greater detail in reference to FIG. 3.

Exemplary Method

Figure 3:
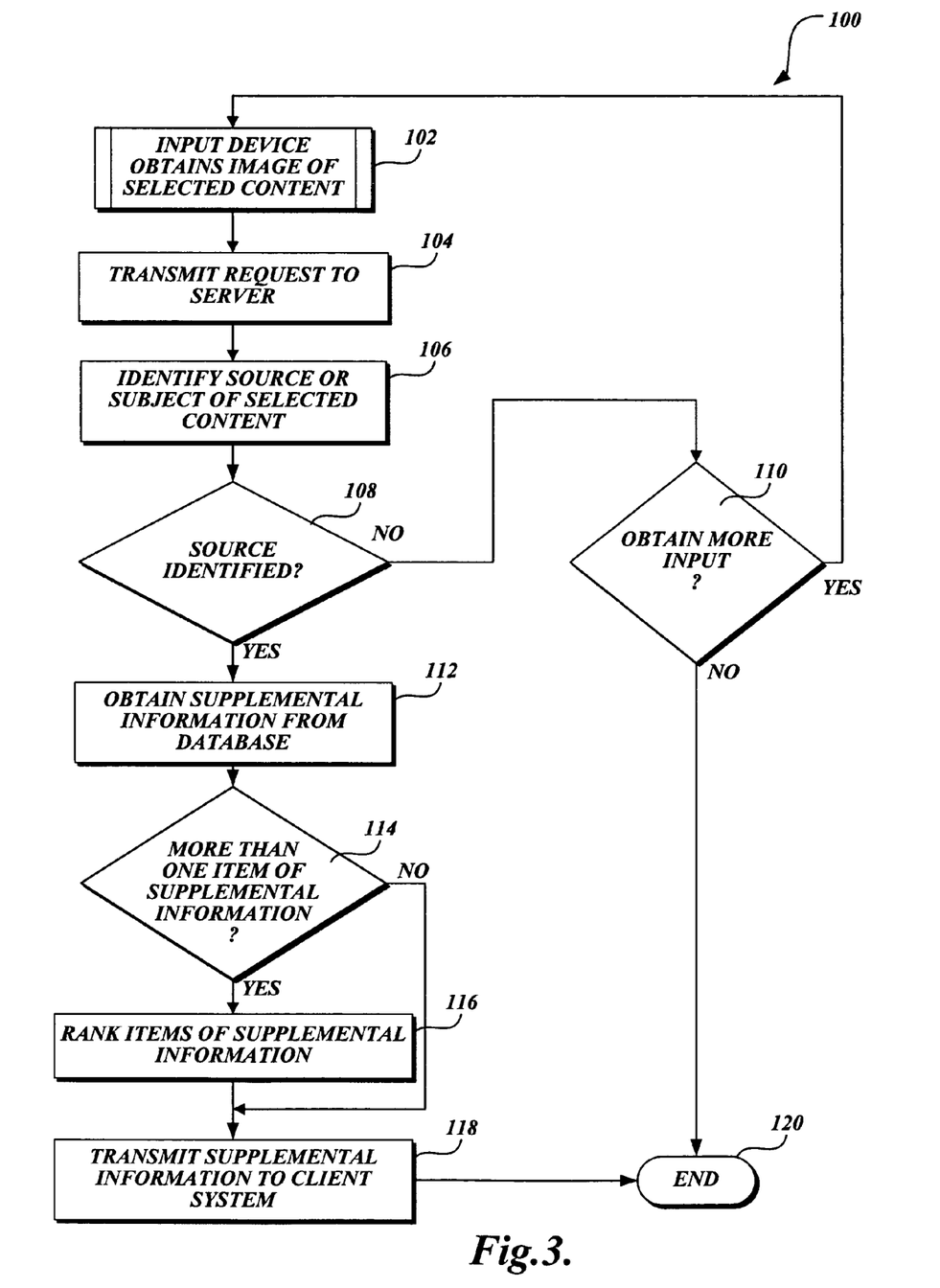
FIG. 3 is a flow diagram of one exemplary method for providing supplemental information to users of selected content in media.
Figure 4:
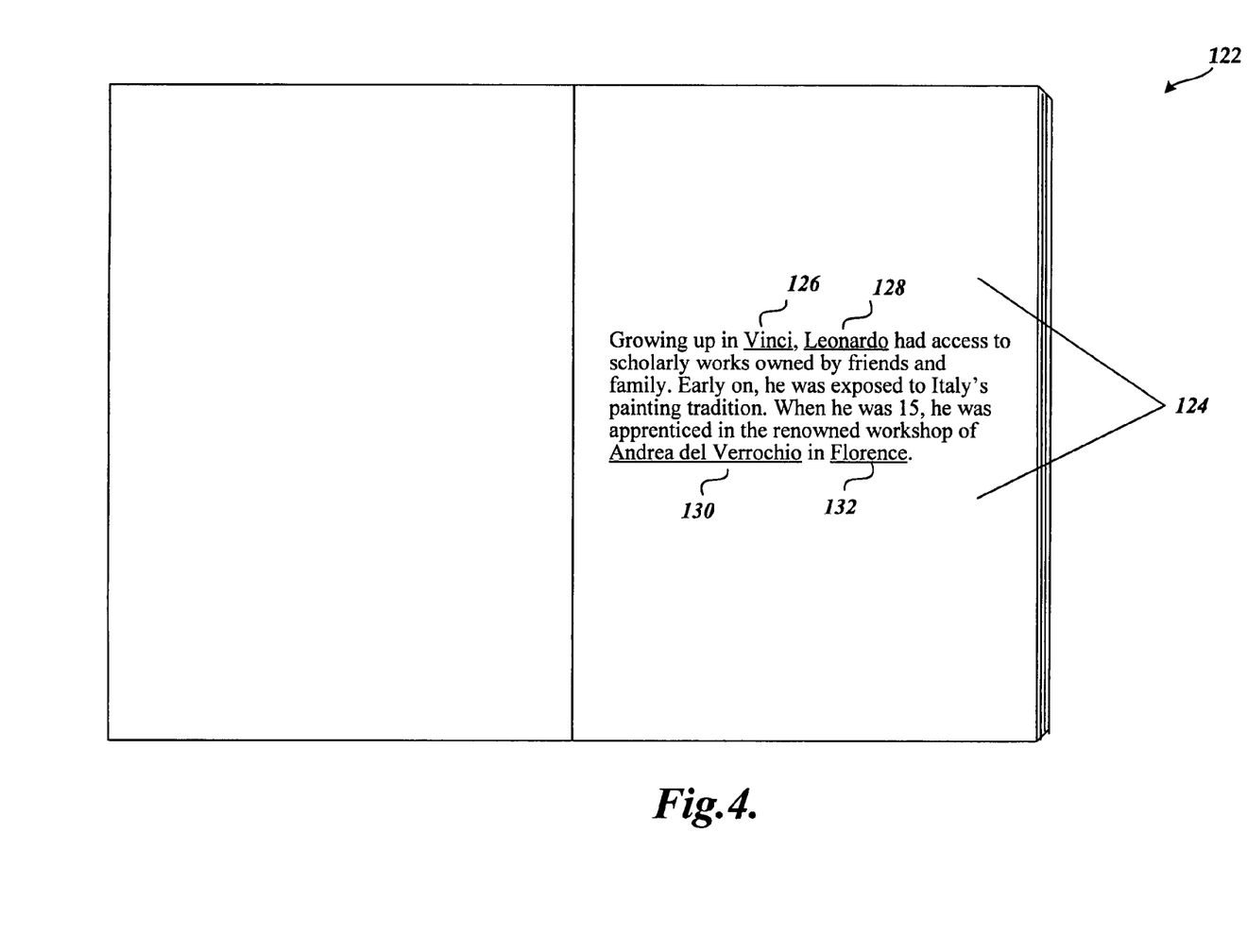
FIG. 4 is a pictorial depiction of a book that contains selected content in printed form for purposes of illustrating embodiments of the present invention.

FIG. 3 is a flow diagram of one exemplary method 100 designed to make relevant supplemental information available to users of content. Although the method 100 is described in a context where the content is embodied in print media, the same or similar processes may be employed in contexts where the user's content is embodied in other forms, such as audio or video media. The method 100 begins at block 102 by obtaining one or more images of selected content. As will be appreciated by those skilled in the art, commercially available hardware such as a video camera, scanner, digital camera, copier, scanning pen, or other device capable of capturing an image of content may be used. Such content, for example, may be a page of a book as shown in FIG. 4. The user may "select" the content by simply allowing the book to be subjected to an input device that captures an image of the page. If desired, affirmative user input may be obtained to further define the selected content, though such is not necessary. Affirmative user input may include conventional electronic input (e.g., using a computer keyboard or mouse) or other forms of input, such as a user gesture (e.g., finger pointing to content in the image or circling, underlining, or tapping content in the image) or speech recognition. Different user gestures may be identified and associated with different actions, e.g., a user "circling" a word with his finger prompts the retrieval and display of a definition of the word, a user "underlying" a word prompts the retrieval and display of Web search results, and "tapping" a word prompts the retrieval and display of other relevant supplemental content. The image of the selected content may be stored in any one of a number of computer-readable formats that have been developed for storing image data, including but not limited to JPEG, TIFF, GIF, and BMP formats.

At block 104, a request for supplemental information is transmitted from the client system 12 to the digital media server 10. The user 18 of the client system 12 need not be involved in generating the request for supplemental information as the request may be automatically generated by the client system 12. The client system 12 may also transmit the image obtained at block 102 to the digital media server 10 without requiring user involvement.

The processing of requests for supplemental information in this particular embodiment is performed in a client/server environment. In alternative embodiments, the processing may occur in a standalone system not connected to a network. In yet further alternative embodiments, some of the processes described as operating in the server 10 could operate in the client system 12, or vice versa. For instance, the optical character recognition application 90 could operate on the client system 12 and translate an image of selected content to digital text prior to transmitting the selected content (in digital text form) to the server 10.

1. Identification

The digital media server 10 receives the request for supplemental information and analyzes the image of selected content to identify one or more meaningful characteristics, such as a source or subject of the content, as indicated at block 106. In one aspect, a process for identifying the source of selected content may comprise applying the optical character recognition application 90 to the image of the selected content to recognize some or all of the text in the image. Using one or more strings of digital text (i.e., a collection of one or more characters) obtained from the selected content, the method 100 may search a database of content of known source for strings of content that match. In this example, the digital media server 10 may compare some or all of the digital text obtained from the printed content with digital text stored in the digital media database 26. If matching text is found in the digital media database 26 to sufficiently correlate the image of selected content with content of known source, the source of the selected content is then known. A source of content may be an author, title, series, or compilation of content, for example, from which the selected content in the image is derived. Similar matching algorithms may be employed where the image of selected content is a segment of audio or video. The digital media server 10 may compare the segment of audio or video, or some transformation thereof, with a database of known content in order to find content that matches the input segment. If matching content is identified, the source of the input segment is identified.

Other forms of computer-implemented matching may be used in embodiments of the invention. For example, rather than using a string of digital text to search a repository of known content, the image of the selected content may itself be used to generate a digital signature that is then compared to digital signatures of content of known source. As will be seen below, optical character recognition may or may not be needed in such embodiments.

In one embodiment, a digital signature is generated from an image of selected content by quantifying one or more characteristics of the image. Characteristics such as the amount of white space existing on a page, the distance between lines of printed text, the number of characters, words, or ink marks on the page or in a segment of the text in the page, or the placement of graphics in text or in the page, may all be used, either individually or collectively, to generate a digital signature that represents the image. Signal information in an image may also be transformed to another domain, such as a frequency domain, to generate a digital signature that represents the image.

Once a digital signature is generated from the image of selected content, the source of the selected content may be identified by searching a repository of digital signatures generated from content of known source using the same process as employed on the selected content. A matching digital signature results in identification of the source of the selected content. Some caution should be exercised however when generating and comparing digital signatures of images with distortions from faxing, scanning, multi-generational copying, inconsistent lighting or shadowing, or other skewing that may change or degrade the quality of an image of content.

In another embodiment, a digital signature may be obtained using a hash function that operates on a subset of digital text from the selected content. The hash function produces a hash key (sometimes referred to as a hash value). As known to those skilled in the art, hash functions can be used to represent a large amount of data with a smaller range of data, and is particularly suitable for fast searching. In accordance with one exemplary embodiment, a hash key for a page of printed content may be generated using digital text contained within predetermined fields on the page. For example, the first character of each line of selected content in a page and the length of the first word in each line may be combined to form a hash key. In another example, a hash key may be generated using a hash function that identifies the first character in one or more lines of text and combines it with the number of "ink marks" or strokes used in the first word, including punctuation, in each line of text.

Multiple hash keys for an image of selected content may also be derived and used for searching a database to identify the source of the selected content. For example, a hash function could be employed on portions of digital text occurring at the top and bottom and left and right corners of the text in the image. Having multiple hash keys for an image of known content is useful in cases where part of a page of selected content received from a user is obscured or damaged. A hash function operating on digital text in an undamaged portion of the page image may be used to generate a suitable hash key that identifies the source of the page image when a matching hash key is found in the digital media database 26. In these examples, optical character recognition is not performed on an entire image of selected content and thus conserves computing resources otherwise required for optical character recognition.

In some embodiments, the process of identifying a "meaningful characteristic" of selected content may include scanning a radio-frequency identification (RFID) tag or other information-bearing tag (active or passive) that provides the meaningful characteristic. An RFID tag, for example, can inform the user's system of the source of the content at varying levels of detail and make the identification process much easier.

Identifying a "meaningful characteristic" of selected content may also comprise identifying a subject of the selected content. In one aspect, a subject of selected content may be identified from text or graphics in the selected content, especially where optical character recognition (OCR) is performed. For example, where the selected content includes text and an OCR process on the selected content results in digital text, the method may compare words and phrases in the digital text to a database of known terms to identify those words and phrases having particular meaning, such as the name of a person, place, object, process, concept, etc. Those words or phrases having particular meaning may be designated as key terms for later use when retrieving supplemental information that is relevant to the selected content. Supplemental information may be obtained from a repository of items of information by finding those items of information having one or more key terms that match the key terms recognized in the selected content.

In another aspect, a subject of selected content may be identified from metadata associated with the selected content. For instance, an audio or video segment transmitted to the digital media server 10 may include the name of the song or the movie from which the segment was obtained. Key terms associated with the subject identified in the metadata may then be used to obtain supplemental information relevant to the selected content. For example, the name of a song may be used in the digital media server 10 to identify biographical information or current news stories relevant to the song. In circumstances where the source of the selected content is known (or determined from the selected content as described above), the subject of the content may be identified by referring to the source of the content.

For purposes of faster searching in yet further embodiments, a meaningful characteristic (e.g., source or subject) of selected content may be translated into a key code that is then applied to a database of key codes having supplemental information associated therewith. In that regard, items of supplemental information are assigned one or more key codes that identify their source and subject information. The supplemental information may then be indexed in the supplemental information database 24 by their key codes. When a key code of selected content received from a user matches a key code in the supplemental information database 24, the supplemental information associated with the key code is provided to the user.

Returning to the example in FIG. 3, the source of the selected content is identified in block 106 by searching the digital media database 26. This searching may include one or more types of computer-implemented matching as discussed above (e.g., pattern matching based on text in the selected content or on a digital signature derived from the image of the content).

At decision block 108, the method 100 determines whether a source (or subject) of the selected content was identified at block 106. An image of selected content received from the user may be distorted such that one or more of the matching techniques described above may not be able to accurately identify the source of the content. Alternatively, the digital media database 26 may contain insufficient information to identify the source of the content. If the source (or subject) of the content is identified, the method 100 proceeds to block 112 (described below) to obtain supplemental information that is relevant to the selected content. Conversely, if the source (or subject) of the selected content is not identified, the method 100 proceeds to decision block 110, where a test is conducted to determine whether to obtain additional input. In one embodiment, a determination to obtain additional input is implemented manually with a dialog box or similar mechanism that prompts the user for instructions. In another embodiment, a determination is automatically made based on the type of image received by the method 100 at block 102. The method 100 may obtain a continuous stream of images when a client system 12 captures images with a video camera or similar device. If the user is turning through multiple pages of printed content, some images may not be susceptible to identification because the images are highly skewed. If the method determines that the client system 12 is continuing to capture images of content, a determination may be automatically made to obtain more input (i.e., the method 100 proceeds back to block 102). The method 100 accepts that the client system 12 will eventually capture an image susceptible to identification. Conversely, if the method 100 determines that the client system 12 is not continuing to capture images of content, a determination is made to stop and the method 100 proceeds to block 120 where it terminates.

2. Obtaining Supplemental Content

At block 112, the method 100 obtains supplemental information from a database that associates supplemental information with meaningful characteristics, such as the source or subject of selected content. Assuming, for example, the source of a selected content is identified at block 106, the method 100 proceeds to query a database, such as the supplemental information database 24, for supplemental information associated with the identified source. The database may include information that was previously obtained and stored, or it may include information obtained from a search conducted on-the-fly. In response to the query, the supplemental information database 24 returns supplemental information associated with the identified source for display to the user. In embodiments where multiple meaningful characteristics are obtained from selected content, the database 24 may be queried for supplemental information associated with each of the meaningful characteristics.

At decision block 114, the method 100 determines whether more than one item of supplemental information was obtained at block 112. Multiple items of supplemental information may be ranked using one or more criteria when being presented to a user. The method 100 determines if the supplemental information identified at block 112 is capable of being ranked. When only one item of supplemental information is identified, the supplemental information is not capable of being ranked and the method 100 proceeds to block 118 described below. If more than one item of supplemental information is identified, the supplemental information is capable of being ranked and the method 100 proceeds to block 116.

At block 116, items of supplemental information are ranked using criteria preferably designed to identify the supplemental information that is likely most relevant to the user. Supplemental information may be ranked, for example, based on keyword matching, subject matter classification, and/or popularity of the supplemental information. Criteria using keyword matching may measure the number of times a particular word or phrase occurs in each item of supplemental information. The keyword or keywords used for the criteria may be the same as the meaningful characteristics identified from the selected content as previously described. Embodiments of the invention may determine that items of supplemental information containing more frequent occurrences of the keyword(s) are most relevant to the selected content. Other embodiments may make different determinations of relevancy based on keyword matching.

Subject matter classification may provide another mechanism for ranking multiple items of supplemental content. For instance, if an item of supplemental information has an identifiable title, and the meaningful characteristic previously identified from the selected content is found in the title, the item of information may be deemed more relevant than an item of information in which the meaningful characteristic is found only in the body of the information or is simply related to the source of the selected content.

A measure of popularity may also provide a mechanism for ranking items of supplemental content. Popularity, in this regard, may be defined by the number of times an item of supplemental information has been accessed by users. It may also be defined by user input, such as user voting on the quality of the supplemental information.

Of course, supplemental information may be ranked using different criteria or combinations of criteria. The embodiments described above should be construed as exemplary and not limiting. For example, other mechanisms for ranking items of supplemental content may use known characteristics of the user, such as the user's browsing history or purchase history. Items of supplemental content having some relation to known characteristics of the user may be ranked higher and presented first to the user.

3. Presenting Supplemental Content to User

At block 118, supplemental information responsive to the request made at block 104 is transmitted from the digital media server 10 to the client system 12 that generated the request. Transmission of supplemental information may utilize any one of a number of communication protocols known in the art. In one exemplary embodiment, supplemental information is transmitted to the user in a markup document, such as a markup document depicted in FIGS. 5A-5C and FIG. 6, and displayed in a Web browser application. Once the supplemental information is transmitted to the client system 12, the method 100 proceeds to block 120 where it terminates. In embodiments where the user is turning through multiple pages of content, the process 100 may be automatically and continuously repeated, without user input other than simply turning through the pages. Supplemental information to be displayed to the user may be immediately displayed or stored for later viewing by the user.

Implementations of the present invention are not limited to the method 100 shown in FIG. 3. Other methods may include additional actions or eliminate actions shown in FIG. 3. For example, as noted above, the present invention may be implemented in a standalone computer not connected to a network. In such an embodiment, blocks 104 and 118, which involve transmission of information between client and server systems, may be eliminated. Also, as described below with reference to FIG. 5B, an implementation of the present invention may choose to not rank items of supplemental information. In that regard, blocks 114 and 116 may be eliminated or replaced with other actions.

The actions shown in FIG. 3 may also be performed in a different order than shown. For example, the ranking of items of supplemental information at block 116 may be performed on a client system after the supplemental information is transmitted at block 118. Thus, the method 100 depicted in FIG. 3 provides just one example of the manner in which an embodiment of the invention may be implemented.

Figure 5A:
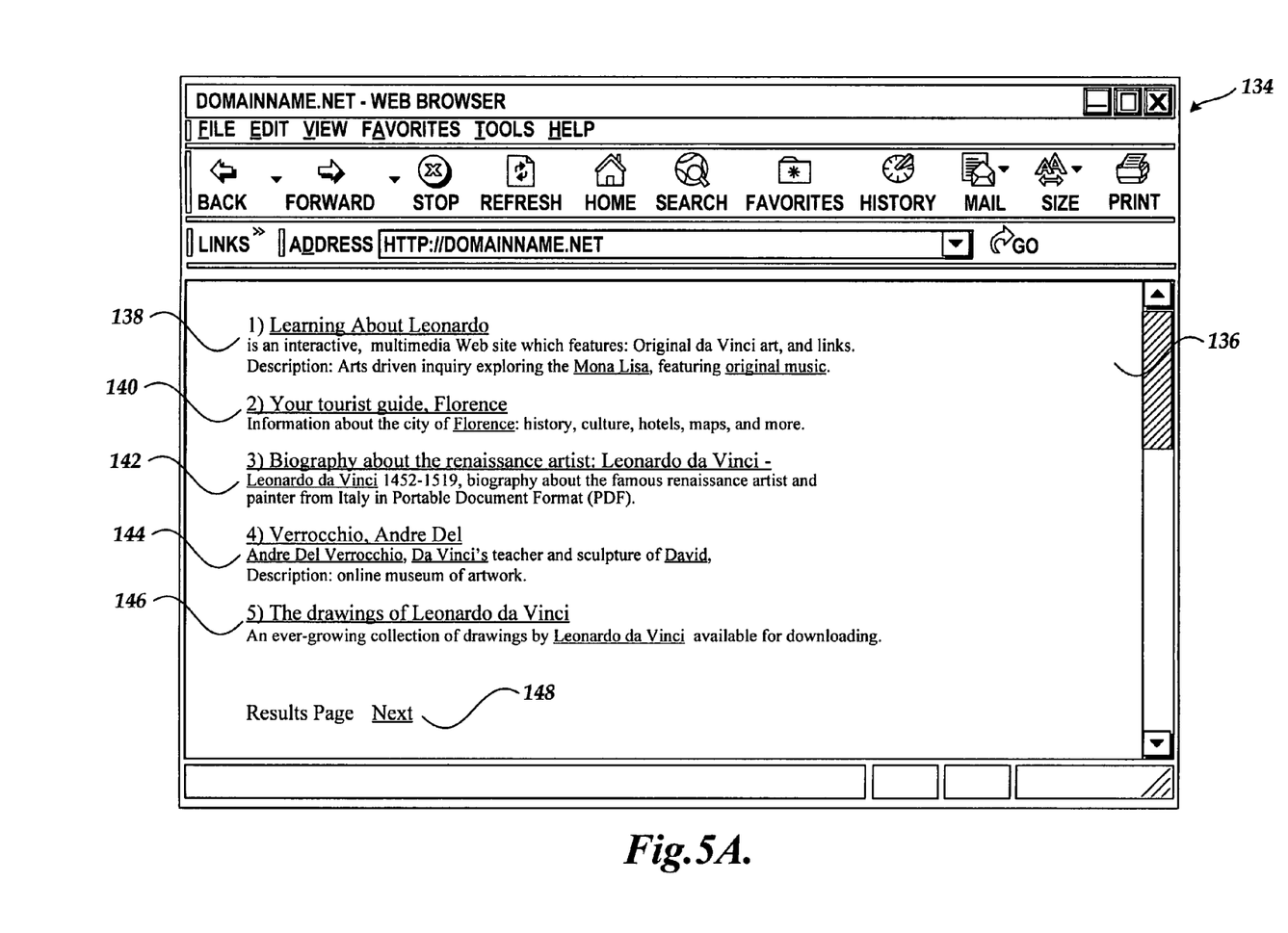
FIG. 5A is a display diagram showing a typical Web browser in which supplemental information relevant to the selected content shown in FIG. 4 is displayed to a user in accordance with the present invention.
Figure 5B:
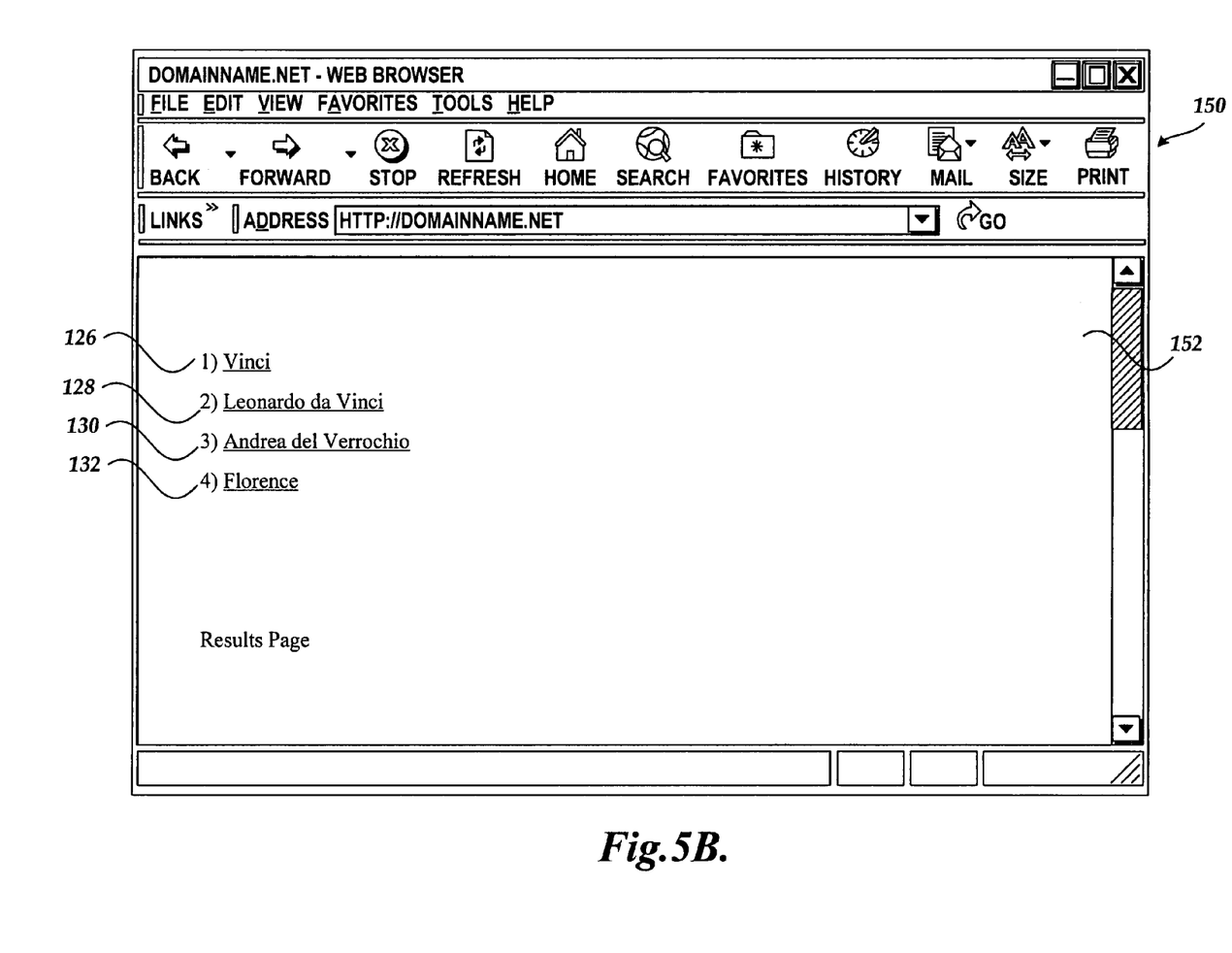
FIG. 5B is a display diagram showing a typical Web browser in which subjects of the selected content shown in FIG. 4 are displayed to a user with links to supplemental content in accordance with the present invention.
Figure 5C:
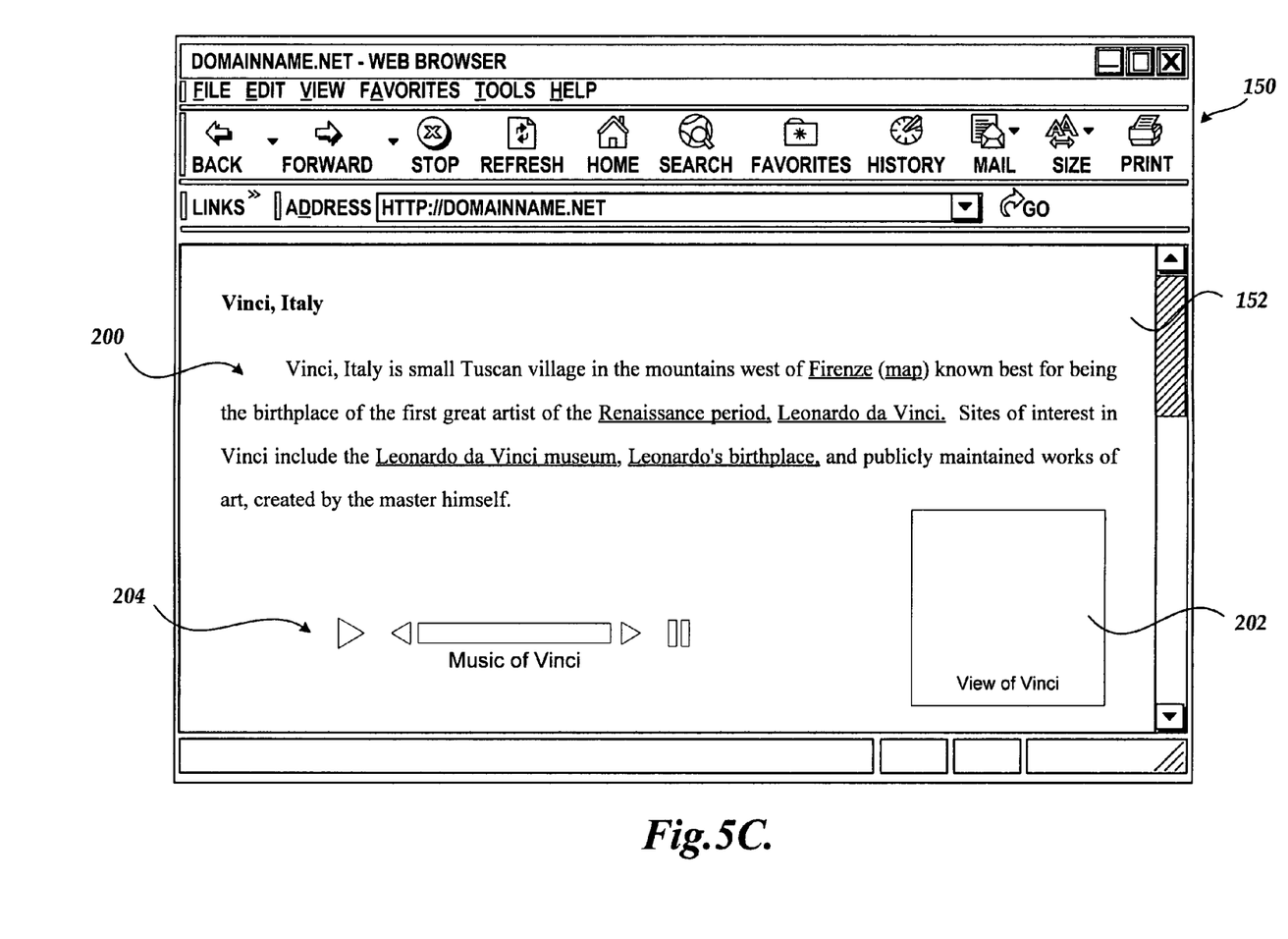
FIG. 5C is a display diagram showing a typical Web browser in which supplemental information associated with a subject shown in FIG. 5B is displayed to a user in accordance with the present invention.
Figure 6:
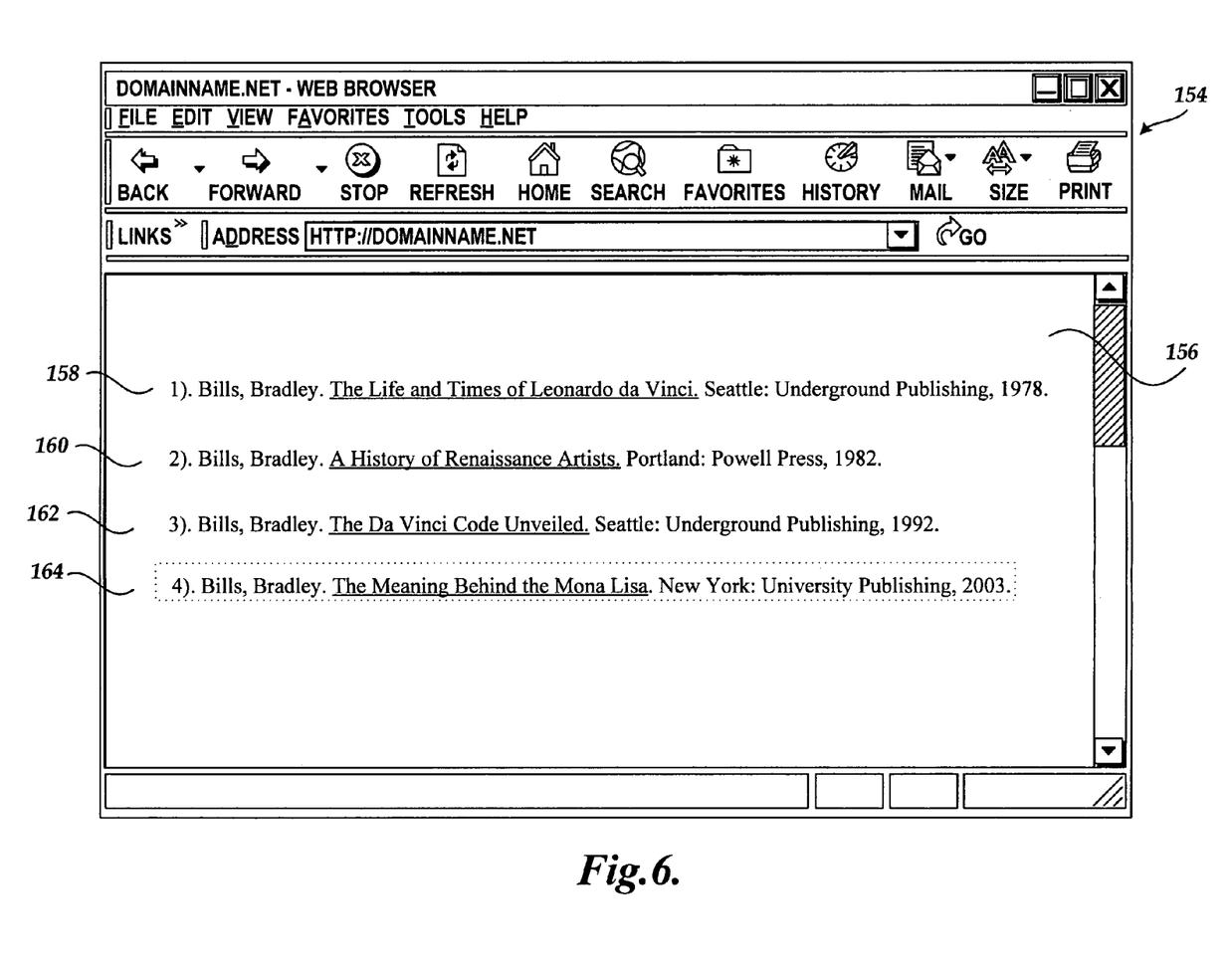
FIG. 6 is a display diagram showing a typical Web browser in which a bibliography is displayed to a user in accordance with the present invention.

Described next in connection with FIGS. 4-6 are specific examples of selected content and sample markup documents with supplemental information that illustrate aspects of the present invention. FIG. 4 depicts a book 122 that contains printed content 124. The content 124 may be "selected" by simply being subjected to a device that captures an image of the content 124. As described above, embodiments of the present invention identify one or more meaningful characteristics of the selected content 124. In FIG. 4, the selected content 124 is shown having four meaningful "subjects" 126, 128, 130, and 132, all of which are associated with supplemental information. For the sake of convenience, much of the following description is provided in the context of searching content obtained from a book, but it should be well understood that the present invention is applicable to searching other forms of content. References herein to specific types of media, such as a book, is only illustrative and not limiting to the invention.

FIGS. 5A-5C are Web pages displayed in a Web browser that illustrate further aspects of the present invention. With reference to FIG. 5A, the Web browser 134 includes a display area 136 for displaying items of supplemental information to a user. By way of example only, the display area 136 features supplemental information related to the subjects 126, 128, 130, and 132 that were previously identified in the selected content 124 (FIG. 4). The items of supplemental information in FIG. 5A may be presented to the user in a format that ranks the supplemental information based on a set of criteria. Links to the supplemental information, including links 138, 140, 142, 144, and 146 may use conventional mechanisms that direct a user to a network address, e.g., in the form of a Uniform Resource Locator (URL). To obtain the supplemental information, the user activates a link with the use of a mouse or similar input device.

As illustrated in FIG. 5A, the display area is also configured with embedded controls, such as a next button 148 that allows a user to request another batch of supplemental information. When the next button 148 is activated, a signal is sent to the digital media server 10 where a next batch of supplemental information is obtained from the supplemental information database 24 for display to the user. As will be appreciated by those skilled in the art and others, FIG. 5A is a highly simplified example illustrating certain aspects of the present invention.

FIG. 5B depicts a Web browser 150 that includes several elements similar to the Web browser 134 described above. In the foregoing example, meaningful characteristics (namely subjects) are identified from the selected content 124. Using the Web browser 150 in FIG. 5B, the user is given an opportunity to receive supplemental information about some or all of the identified meaningful characteristics. Specifically, the display area 152 displays all of the subjects identified from the selected content 124 (FIG. 4). The subjects 126, 128, 130, and 132 are linked to additional Web pages that provide supplemental information about the specific item selected.

Again, one skilled in the art will recognize that FIG. 5B is a highly simplified example illustrating further aspects of the invention.

FIG. 5C depicts the Web browser 150 of FIG. 5B in which the user has activated the "Vinci" link 126. When a link is activated, the Web browser 150 sends a signal to the digital media server 10 requesting supplemental information associated with the activated link. The digital media server 10 queries the supplemental information database 24 and returns supplemental information associated with the meaningful characteristic identified by the link 125 (here, the subject "Vinci"). FIG. 5C depicts a sample Web page showing supplemental information that may be displayed to the user when a link such as link 126 is activated. Supplemental information, in this particular case, includes text 200, visual and graphical information (e.g., photograph 202), and audio information (provided by the playback control 204).

As illustrated in FIG. 5C, the display area 152 may contain additional links to other related meaningful characteristics. Accordingly, a user may select any one of the links and retrieve additional supplemental information relevant to the selected content. Such supplemental information may be displayed to the user in the form of yet another Web page, perhaps similar to that shown in FIG. 5C. Those skilled in the art will appreciate that the retrieved information may contain yet further links to additional supplemental information with additional links (e.g., Web pages containing such links) that enable a user to obtain additional supplemental information.

As previously noted, media in printed form such as books tends to be static in that updates do not occur except by revising and printing another version of the book, or by printing an addendum that is physically added to the book, which requires considerable additional effort. The invention described herein makes relevant supplemental information easily available to users of selected content. Of particular utility is providing supplemental information that updates selected content with current information. For example, FIG. 6 illustrates one possible application of the present invention that updates a bibliography in a book.

As illustrated, FIG. 6 includes a Web browser 154 and a display area 156 for presenting supplemental information to a user. Specifically, the display area 156 displays a bibliography that includes four entries, 158, 160, 162, and 164. The bibliography identifies other publications written by the same author. By way of example only, the bibliography is from a book published in the year 1998 (not listed) and contains entries 158, 160, and 162 that identify books previously published by the author. In the example shown, the user is presented a bibliography having supplemental information added thereto that includes a future bibliographic entry 164, highlighted with a dashed box, identifying a book published after the original bibliographic content input by the user. A user viewing a bibliography in a book can thus readily obtain information about all of the author's publications, despite the static nature of the originally-printed content.

Embodiments of the invention may further be provided in the form of a computer-readable medium whose contents cause a computing system to undertake actions as described above. For example, a computer-readable medium may be inserted into the computer-readable medium drive 76 as shown in FIG. 2B to cause the digital media server 10 to perform optical character recognition on images of selected content received from the client system 12 and return supplemental information that is relevant to the selected content. The computer-readable medium may be further configured with contents causing the computing system to perform other actions described above, such as searching the digital media database 26 and retrieving supplemental information from the supplemental information database 24.

While several embodiments of the invention have been illustrated and described above, it will be appreciated that various changes can be made therein without departing from the spirit and scope of the invention. The scope of the invention, therefore, should be determined from the following claims and equivalents thereto.

The embodiments of the invention in which an exclusive property or privilege is claimed are defined as follows:

1. A computer-implemented method for providing supplemental information to a user of media, in which the supplemental information is relevant to selected content in the media, the method comprising:
   obtaining an image of the selected content in the media;
   generating a new data type representation of the selected content from the image;
   identifying an author of the selected content, wherein the author is identified using the new data type representation;
   obtaining supplemental information that is relevant to the author of the selected content; and
   providing the supplemental information to the user of the media,
   wherein identifying the author of the selected content comprises:
      recognizing some or all of the selected content in the new data type representation;
      searching content of known source for matching content; and
      when matching content is found, identifying the author of the selected content based on the known source of the matching content.

2. The method of claim 1, wherein the media is print media and the image of the selected content includes text or graphics.

3. The method of claim 2, wherein the print media is a physical print and the image of the selected content is captured from the physical print using a digital imaging device.

4. The method of claim 1, wherein the media is a digital file having one or more visually-perceptible images of text or graphics and the image of the selected content is obtained from the digital file.

5. The method of claim 1, wherein the media is audio and the image of the selected content is a segment of the audio.

6. The method of claim 1, wherein the media is video and the image of the selected content is a segment of the video.

7. The method of claim 1, wherein generating the new data type representation of the selected content further includes generating a digital signature from the image of the selected content, and wherein identifying the author further includes searching digital signatures of content of known source for a matching digital signature.

8. The method of claim 7, wherein the digital signature is generated from one or more features of the image of the selected content.

9. The method of claim 7, wherein the digital signature is generated from one or more recognized portions of the content in the image.

10. The method of claim 1, wherein the supplemental information is obtained from items of information having one or more associated key terms that match the identified author.

11. The method of claim 1, further comprising translating the identified author to a key code, wherein the supplemental information is obtained from items of information having one or more associated key codes that match the key code of the identified author.

12. The method of claim 1, further comprising ranking the supplemental information based on one or more criteria and providing the supplemental information to the user in accordance with the ranking.

13. The method of claim 12, wherein the criteria include one of keyword matching criteria, subject matter classification, and popularity of the supplemental information.

14. A computer system for providing supplemental information to a user of media, comprising:
   a digital media database;
   a supplemental information database; and
   a digital media server in communication with the digital media database and supplemental information database, wherein the digital media server is configured to:
      receive an image of selected content in the media;
      generate a new data type representation of the selected content from the image;
      identify a source of the selected content from which the selected content derives, wherein the source of the selected content is identified using the new data type representation;
      retrieve supplemental information from the supplemental information database that is relevant to the source of the selected content; and
      provide the supplemental information to the user of the media,
   wherein the digital media database contains content of known source, and the digital media server is configured to identify the source of the selected content by recognizing some or all of the selected content in the new data type representation and searching the digital media database for matching content, and when matching content is found, identifying the source of the selected content based on the known source of the matching content.

15. The system of claim 14, wherein the digital media database contains digital signatures representing content of known source, and the digital media server is further configured to generate the new data type representation of the selected content by generating a digital signature from the image of the selected content and to determine the source of the selected content by searching the digital media database for a matching digital signature.

16. The system of claim 14, wherein the supplemental information provided by the digital media server includes a link that, when activated by a user, causes the digital media server to retrieve and provide additional supplemental information to the user.

17. The system of claim 14, wherein the digital media server is further configured to rank the supplemental information based on one or more criteria and provide the supplemental information to the user in accordance with the ranking.

18. A non-transitory computer-readable medium whose contents stored thereon cause a computing system to:
   obtain an image of selected content in media being used by a user without requiring affirmative input from the user;
   generate a new data type representation of the selected content from the image;
   automatically identify an author of the selected content, wherein the author of the selected content is identified using the new data type representation;
   obtain supplemental information that is relevant to the author of the selected content; and
   provide the supplemental information in a form accessible to the user of the media, wherein the new data type representation is a digital signature generated from the image of the selected content, and wherein the author of the selected content is identified by:
generating the digital signature from the image of the selected content;
searching digital signatures of content of known source for a matching digital signature; and
when a matching digital signature is found, identifying the author of the selected content based on the known source of the image having the matching digital signature.

19. A computer-implemented method for providing supplemental information to a user of media in which the supplemental information is relevant to selected content in the media, the method comprising:
obtaining an image of the selected content in the media;
generating a new data type representation of the selected content from the image;
identifying a source of the selected content using the new data type representation;
obtaining supplemental information that is relevant to the source of the selected content; and
providing the supplemental information to the user of the media,
wherein the new data type representation is a digital signature generated from the image of the selected content, and
wherein the source of the selected content is identified by:
generating the digital signature from the image of the selected content;
searching digital signatures of content of known source for a matching digital signature; and
when a matching digital signature is found, identifying the source of the selected content based on the known source of the image having the matching digital signature.

20. The method of claim 19, further comprising identifying a subject of the selected content from text or graphics in the selected content.

21. The method of claim 19, further comprising identifying a subject of the selected content from metadata associated with the selected content.

22. The method of claim 19, further comprising identifying a subject of the selected content from the identified source of the selected content.

23. The method of claim 19, wherein the media is print media and the image of the selected content includes text or graphics.

24. The method of claim 23, wherein the print media is a physical print and the image of the selected content is captured from the physical print using a digital imaging device.

25. The method of claim 22, wherein the subject of the selected content comprises the name of a person, place, object, process, or concept of the selected content.

* * * * *